United States Patent Office 3,808,333
Patented Apr. 30, 1974

3,808,333
O-(2-AMINO-4-METHYL-PYRIMIDYL-6)-
THIOPHOSPHOROAMIDATE
Karlheinz Milzner, Basel, and Fritz Reisser, Therwil, Switzerland, assignors to Sandoz Ltd. (also known as Sandoz AG), Basel, Switzerland
No Drawing. Filed Aug. 3, 1971, Ser. No. 168,764
Claims priority, application Switzerland, Aug. 7, 1970, 11,893/70
The portion of the term of the patent subsequent to May 16, 1989, has been disclaimed
Int. Cl. C07d 51/42
U.S. Cl. 260—256.5 R        8 Claims

ABSTRACT OF THE DISCLOSURE

The present invention concerns new phosphoric acid amide esters of the formula

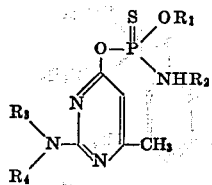

wherein $R_1$ is alkyl of 1 to 4 carbon atoms,
$R_2$ is alkyl of 1 to 4 carbon atoms,
$R_3$ is hydrogen or alkyl of 1 to 4 carbon atoms, and
$R_4$ is hydrogen or alkyl of 1 to 4 carbon atoms, and agriculturally or veterinary acceptable acid addition salts thereof, which possess insecticidal properties.

---

The present invention relates to new phosphoric acid amide esters.

The present invention provides compounds of Formula I,

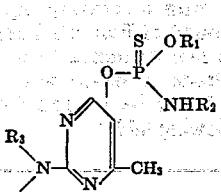

wherein $R_1$ is alkyl of 1 to 4 carbon atoms,
$R_2$ is alkyl of 1 to 4 carbon atoms,
$R_3$ is hydrogen or alkyl of 1 to 4 carbon atoms, and
$R_4$ is hydrogen or alkyl of 1 to 4 carbon atoms, and acid addition salts thereof.

The present invention also provides a process for the production of a compound of Formula I or an acid addition salt thereof comprising reacting a compound of Formula II,

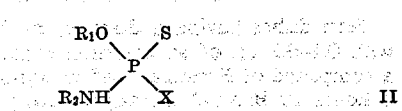

wherein $R_1$ and $R_2$ have the above significances, and
X is chlorine or bromine, with a compound of Formula III,

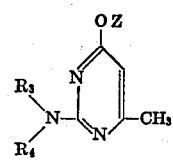

wherein $R_3$ and $R_4$ have the above significances, and
Z is hydrogen or a cation.

Preferred cations are alkali metal cations, particularly sodium, and quaternary amino cations.

The production may be effected as follows:

A compound of Formula II is added to a compound of Formula III each in a solvent inert under the reaction conditions, e.g. an aromatic hydrocarbon, such as toluene or xylene, a halogenated hydrocarbon such as chlorobenzene or chloroform, a ketone such as acetone or methyl isobutyl ketone, an ether such as dioxane or tetrahydrofuran or an amide such as dimethylformamide. The temperature of the reactants may be between 0° and 100° C., preferably room temperature. If Z in Formula III is hydrogen, it is preferable to employ an acid acceptor such as triethylamine or potassium carbonate. The reaction mixture is conveniently stirred at a temperature between room temperature and the boiling temperature of the solvent for a period of between a few minutes and about 5 hours. The reaction product is worked up in conventional manner. The pure compounds of Formula I are obtained as colorless oils or crystalline products which may be characterized, for example, by their $Rf$ value or the melting point. They are soluble in organic solvents and can be readily emulsified with water.

The compounds of general Formulas II and III, required as starting materials, have been described in the literature.

The compounds of general Formula I and their agriculturally or veterinary acceptable acid addition salts are useful as insecticides as indicated by their insecticidal properties. The compounds are effective against chewing and sucking insects and also against spider mites.

The term "insects" as used herein includes not only the members of the class Insecta, but also related or similar nonvertebrate animal organisms belonging to allied classes and including acarids and mites.

The compounds also possess low toxicity in warm-blooded animals and low phytotoxicity. The compounds are therefore indicated for use as insecticides in inhabited rooms, cellars and attics, in stables and the like and in combatting insects in plants and animals, e.g., against mites in veterinary medicine.

The alkylating ability of the compounds is lower than that of chemically similar compounds specifically disclosed in British Pat. 1,129,563.

The compounds may be used in admixture with carriers usually employed for insecticides.

The combatting of insects may be carried out by conventional procedures, e.g. by treating a plant locus, object or animal to be protected, with an insecticidal composition including a compound of the invention. For use in plant protection or in combatting insects in objects or animals, insecticidal compositions may be employed in the form of dusting or spraying agents, e.g., as solutions or dispersions, worked up with water or suitable organic solvents, e.g., alcohol, petroleum or tar distillates, as well as emulsifiers, e.g., liquid polyglycol ethers derived from high molecular weight alcohols, mercaptans or alkyl phenols, and an alkylene oxide. Suitable organic solvents such as ketones, aromatic, optionally halogenated hydrocarbons, or mineral oils, may also be added to the mixture as solution aids.

The spraying and dusting agents may contain conventional inert carrier materials, e.g., talc, diatomaceous earth, bentonite, pumice or other additives such as cellulose derivatives as well as the usual wetting agents and adhesives to improve wettability and adhesiveness.

The compounds of the invention may be present in the insecticidal compositions in admixture with other known active agents either in the concentrate forms or in the application forms of the compositions. Concentrate forms may generally contain between 2 and 90%, preferably between 5 and 50% by weight of active agent. The application forms may generally contain between 0.02 and 90%, preferably between 0.1 and 20% by weight of active agent.

The active agent concentrates may be produced in known manner, e.g.:

(a) 25 parts by weight of a compound of general Formula I are mixed with 25 parts by weight of isooctylphenyldecalglycol ether and 50 parts by weight of xylene, whereby a clear concentrate solution is obtained which may be readily emulsified and diluted in water to the desired concentration.

(b) 25 parts by weight of a compound of general Formula I are mixed with 30 parts by weight of isooctylphenyloctaglycol ether and 45 parts by weight of a petroleum fraction having a boiling point of 210–280° ($D_{20}=0.92$). The concentrate may be diluted with water to the desired concentration.

(c) 50 parts by weight of a compound of general Formula I are mixed with 50 parts by weight of isooctylphenyloctaglycol ether. A clear concentrate is obtained which may be readily emulsified and diluted in water to the desired concentration.

The following application examples illustrate the insecticidal effectiveness of the compounds of the invention but in no way limit the scope of the invention.

Insecticidal effect against *Carausius morosus* (Indian rod locust)—stomach poison effect Tradescantia branches are immersed for 3 seconds in an emulsion containing 0.0125% of a compound of Formula I to form a coating on each branch. After drying the coating each of the Tradescantia branches is inserted into a small glass tube filled with water which is placed in a glass dish. 10 Carausius larvae in the second stage of development are counted into each dish which is then closed with a wire mesh lid. After 5 days the rate of mortality is determined by counting out the live and dead animals. The rate of mortality is indicated as a percentage. 100% means that all rod locusts were killed, 0% means that no rod locust was killed. The results are set out in the following table.

| Compound of Formula I | Rate of mortality [1] |
|---|---|
| S, OCH₃ / O—P / NHCH₃ ; (H₃C)₂N—pyridine—CH₃ | 100 |
| S, OCH₃ / O—P / NHC₂H₅ ; (H₃C)₂N—pyridine—CH₃ | 100 |

[1] In percent after 5 days.

Insecticidal effect against *Aphis fabae* (black bean aphid)—contact effect

Broad bean plants (*Vicia faba*) are sprayed to run off with a spraying liquor containing 0.0125% of a compound of Formula I. The broad bean plants are strongly infected with all the forms of development of the black bean aphid (*Aphis fabae*). After 2 days the rate of mortality is determined. The mortality rate is indicated as a percentage. 100% means that all bean aphids were killed, 0% means that no bean aphid was killed. The results are set out in the following table.

| Compound of Formula I | Rate of mortality [1] |
|---|---|
| S, OCH₃ / O—P / NHCH₃ ; (CH₃)₂N—pyridine—CH₃ | 100 |
| S, OCH₃ / O—P / NHC₂H₅ ; (CH₃)₂N—pyridine—CH₃ | 100 |
| S, OCH₃ / O—P / NHCH₃ ; (C₂H₅)₂N—pyridine—CH₃ | 100 |

[1] In percent after 48 hours.

Insecticidal effect against Prodenia caterpillars (Egyptian leafworm)—stomach poison effect 10 Prodenia larvae each having a length of about 7 mm. are counted into plastic dishes. Bush bean leaves (*Phaseolus vulgaris*), prepared by spraying bush bean plants to run off with a spraying liquor containing 100 p.p.m. of a compound of Formula I are fed to the larvae. After 6 days the rate of mortality is determined. 100% means that all Prodenia larvae were killed, 0% means that no Prodenia larvae were killed. The evaluation is indicated in the following table:

| Compound of Formula I | Rate of mortality [1] |
|---|---|
| S, OCH₃ / O—P / NHCH₃ ; (CH₃)₂N—pyridine—CH₃ | 100 |

[1] In percent after 48 hours.

Insecticidal effect against *Bruchidius obtectus* (bean weevil)—contact effect

Petri dishes having a diameter of 7 cm. are sprayed with 0.1–0.2 cc. of an emulsion containing 0.0125% of a compound of Formula I. After drying the emulsion for 4 hours 10 Bruchidius-Imagines are put into each dish, which are covered with a lid of fine mesh brass gauze. The bean weevils are kept at room temperature and are given no food. After 48 hours the rate of mortality is determined as a percentage. 100% means that all bean weevils were killed, 0% means that no bean weevil was killed. The results are set out in the following table.

| Compound of Formula I | Rate of mortality [1] |
|---|---|
| (H₃C)₂N-[pyrimidine structure with S,OCH₃,O-P,NHC₂H₅] | 100 |
| (C₂H₅)₂N-[pyrimidine structure with S,OCH₃,O-P,NHCH₃,CH₃] | 100 |

[1] In percent after 48 hours.

The following examples illustrate the production of the compounds without in any way limiting the scope of the invention. The temperatures are indicated in degrees centigrade.

EXAMPLE 1.—O-methyl-N-methyl-O-(2-dimethyl-amino-4-methyl-pyrimidyl-6)-thiophosphoroamidate

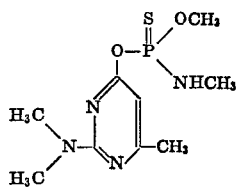

30.2 g. (0.189 mole) of O-methyl-N-methyl-thiophosphoroamidochloridate are added within half an hour to a solution of 32.0 g. (0.189 mole) of the sodium salt of 2-dimethylamino-4-methyl-6-hydroxy pyrimidine in 200 cc. of toluene at room temperature. The reaction mixture is subsequently stirred for half an hour at room temperature and 3 hours at 50–60°. After cooling, the reaction mixture is filtered with suction, the filtrate is washed with water until the water reaches the pH value of 7, the toluene solution is dried with sodium sulphate and concentrated by evaporation in a vacuum. O-methyl-N-methyl-O-(2 - dimethylamino-4-methyl-pyrimidyl-6)-thiophosphoroamidate is obtained as white crystals and is recrystallized from ether. White crystals, having a melting point of 79.5–80°, are obtained.

*Analysis.*—$C_9H_{17}N_4O_2PS$ (molecular weight: 276.3). Calculated (percent): C, 39.1; H, 6.2; N, 20.3; P, 11.2; S, 11.6. Found (percent): C, 38.8; H, 6.1; N, 20.4; P, 11.4; S, 11.8. R*f* value: 0.21 (ether:hexane=1:2 on silica gel).

The substances produced as an oil are purified on a silica gel column. Ether:hexane=1:2 is used as eluant. The degree of purity is checked on a silica gel thin layer plate, prepared with a fluorescence indicator with a wavelength maximum of 254 mμ, with ether:hexane=1:2 as eluant.

EXAMPLE 2.—O-methyl-N-n-propyl-O-(2-diethyl-amino-4-methyl-pyrimidyl-6)-thiophosphoroamidate

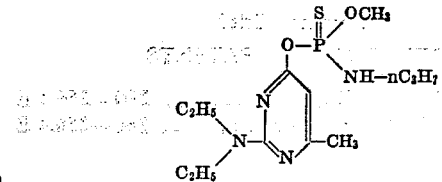

37.6 g. (0.2 mole) of O-methyl-N-n-propyl-thiophosphoroamidochloridate are added within 15 minutes to a solution of 40.6 g. (0.2 mole) of the sodium salt of 2-diethylamino-4-methyl-6-hydroxy pyrimidine in 200 cc. of toluene at room temperature. The reaction mixture is subsequently stirred for a further 2 hours at room temperature and worked up in usual manner after control of the reaction course by thin layer chromatography.

*Analysis.*—$C_{13}H_{25}N_4O_2S$ (molecular weight: 332.4). Calculated (percent): C, 47.0; H, 7.6; N, 16.9; P, 9.3; S, 9.6. Found (percent): C, 46.7; H, 7.4; N, 16.7; P, 9.5; S, 9.7. R*f* value: 0.55 (ether:hexane=1:2 on silica gel).

In manner analogous to Examples 1 and 2, the following compounds of Formula I are obtained:

| | | | | | | | | Analysis, percent | | | | | | | |
|---|---|---|---|---|---|---|---|---|---|---|---|---|---|---|---|
| | | | | | | | | Calculated | | | | Found | | | |
| Example | R₁ | R₂ | R₃ | R₄ | Molecular formula | Molecular weight | R*f* value [1] | M.P. (°C.) | C | H | N | P | S | C | H | N | P | S |
| 3 | CH₃ | CH₃ | C₂H₅ | C₂H₅ | $C_{11}H_{21}N_4O_2PS$ | 304.4 | 0.40 | Oil | 43.4 | 7.0 | 18.4 | 10.2 | 10.5 | 43.7 | 7.2 | 18.1 | 9.9 | 10.3 |
| 4 | CH₃ | C₂H₅ | C₂H₅ | C₂H₅ | $C_{12}H_{23}N_4O_2PS$ | 318.4 | 0.49 | Oil | 45.3 | 7.3 | 17.6 | 9.7 | 10.1 | 44.9 | 7.3 | 17.4 | 9.9 | 10.3 |
| 5 | CH₃ | i-C₃H₇ | C₂H₅ | C₂H₅ | $C_{13}H_{25}N_4O_2PS$ | 332.4 | 0.56 | Oil | 47.0 | 7.6 | 16.9 | 9.3 | 9.6 | 46.8 | 7.7 | 16.8 | 9.4 | 9.7 |
| 6 | CH₃ | i-C₃H₇ | CH₃ | CH₃ | $C_{11}H_{21}N_4O_2PS$ | 304.4 | 0.33 | Oil | 43.4 | 7.0 | 18.4 | 10.2 | 10.5 | 43.7 | 7.1 | 18.2 | 10.0 | 10.8 |
| 7 | CH₃ | C₂H₅ | CH₃ | CH₃ | $C_{10}H_{19}N_4O_2PS$ | 290.32 | 0.28 | Oil | 41.4 | 6.6 | 19.3 | 10.7 | 11.0 | 41.1 | 6.7 | 19.1 | 11.0 | 11.2 |

[1] On silica gel thin layer plate, eluant ether: hexane = 1:2.

In a manner analogous to that described in Examples 1 and 2, the following compounds are produced, viz.

O-methyl-N-methyl-O-(2-methylamino-4-methyl-pyrimidyl-6)-thiophosphoroamidate, and
O-methyl-N-methyl-O-(2-amino-4-methyl-pyrimidyl-6)-thiophosphoroamidate.

What is claimed is:
1. A compound of the formula

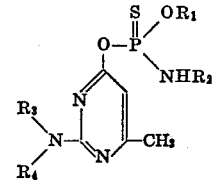

wherein

R₁ is alkyl of 1 to 4 carbon atoms,
R₂ is alkyl of 1 to 4 carbon atoms,
R₃ is hydrogen or alkyl of 1 to 4 carbon atoms, and
R₄ is hydrogen or alkyl of 1 to 4 carbon atoms, or an agriculturally or veterinary acceptable acid addition salt thereof.

2. A compound of claim 1, wherein each of R₁, R₂, R₃ and R₄ is methyl.

3. A compound of claim 1, wherein R₁ is methyl, R₂ is n-propyl, R₃ is ethyl and R₄ is ethyl.

4. A compound of claim 1, wherein R₁ is methyl, R₂ is methyl, R₃ is ethyl and R₄ is ethyl.

5. A compound of claim 1, wherein R₁ is methyl, R₂ is ethyl, R₃ is ethyl and R₄ is ethyl.

6. A compound of claim 1, wherein R₁ is methyl, R₂ is isopropyl, R₃ is ethyl and R₄ is ethyl.

7. The compound of claim 1, wherein R₁ is methyl, R₂ is isopropyl, R₃ is methyl and R₄ is methyl.

8. The compound of claim 1, wherein $R_1$ is methyl, $R_2$ is ethyl, $R_3$ is methyl and $R_4$ is methyl.

References Cited
UNITED STATES PATENTS

| 3,159,630 | 12/1964 | Rigterink | 260—256.4 E |
|---|---|---|---|
| 3,663,544 | 5/1972 | Milzner et al. | 260—256.4 E |

FOREIGN PATENTS 1,129,563  10/1968  Great Britain ___ 260—256.4 E

RICHARD J. GALLAGHER, Primary Examiner

U.S. Cl. X.R.

424—200